US 6,583,212 B2

(12) United States Patent
Borst et al.

(10) Patent No.: US 6,583,212 B2
(45) Date of Patent: Jun. 24, 2003

(54) AQUEOUS DISPERSIONS FOR COATING COMPOSITIONS

(75) Inventors: Joseph P. Borst, Plymouth, MI (US); Sergio E Balatan, West Bloomfield, MI (US); Walter H. Ohrbom, Hartland Township, MI (US); Robert D. Weise, Harper Woods, MI (US); Davide J. Law, Livonia, MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 10/015,095

(22) Filed: Dec. 11, 2001

(65) Prior Publication Data

US 2002/0169249 A1 Nov. 14, 2002

Related U.S. Application Data

(63) Continuation of application No. 09/752,418, filed on Dec. 31, 2000, now abandoned.

(51) Int. Cl.[7] .............................. C08J 3/02; C08K 3/20; C08K 9/00; C08L 33/00
(52) U.S. Cl. ........................................ 524/501; 523/200
(58) Field of Search ........................... 524/501; 523/200

(56) References Cited

U.S. PATENT DOCUMENTS

| 4,677,168 A | 6/1987 | Hoy et al. ................... 525/441 |
| 6,391,973 B1 * | 5/2002 | Law et al. |

FOREIGN PATENT DOCUMENTS

| EP | 761 695 | 8/1996 | .............. C08F/8/00 |
| EP | 989 163 | 9/1999 | ......... C08L/101/06 |
| EP | 995 778 | 10/1999 | .............. C09D/7/06 |
| WO | WO95/07951 | 3/1995 | .............. C09D/5/02 |
| WO | WO97/35898 | 10/1997 | ........... C08G/18/10 |
| WO | WO98/44060 | 10/1998 | ......... C09D/125/14 |
| WO | WO00/26308 | 5/2000 | ........... C09D/17/00 |

OTHER PUBLICATIONS

BASF Corporation, et al., International Search Report PCT/US01/48628, International Filing Date Dec. 17, 2001.
English Abstract for WO97/35898 is on cover page of the International Publication.
English Abstract for WO98/44060 is on cover page of the International Publication.
Database WPI, Section Ch, Week 199333, AN 1993–261851, XP002206757.

* cited by examiner

Primary Examiner—Patrick D. Niland
(74) Attorney, Agent, or Firm—Mary E. Golota

(57) ABSTRACT

The invention provides curable coating compositions comprising an aqueous dispersion comprising a stabilizing resin (P1) and a compound (P2) comprising functional groups reactable with a crosslinking agent. Compound (P2) is dispersed into stabilizing resin (P1). The coating compositions of the invention may further comprise an optional crosslinking agent (P3) which may or may not be dispersed into stabilizing resin (P1). In a particularly preferred embodiment, both the stabilizing resin (P1) and compound (P2) will comprise functional groups which are carbamate or are convertible to carbamate.

16 Claims, No Drawings

AQUEOUS DISPERSIONS FOR COATING COMPOSITIONS

CROSS-REFERENCE TO RELATED APPLICATION

The present application is a continuation and claims priority upon patent application U.S. Ser. No. 09/752,418, filed on Dec. 31, 2000, now abandoned, which is incorporated herein by reference.

FIELD OF THE INVENTION

The invention relates to aqueous, curable coating compositions and coatings produced therefrom. In particular, the invention relates to coatings used in multilayer coating systems intended for use in the automobile industry, especially composite color-plus-clear coating systems.

BACKGROUND OF THE INVENTION

The effect of the coating process on the environment and the effect of the environment on coatings have increasingly shaped the coatings art in the last few decades. The industry has put considerable effort into developing coatings with materials that will be less harmful toward the environment, such as coatings containing lower levels of volatile organic compounds for a lower impact on the environment during their application. As another concern, it has been difficult to devise such a coating that will also have the desired resistance to environmental degradation.

One mode of environmental degradation that has attracted attention in recent years is environmental etch. "Environmental etch" is the name given to a kind of surface pitting and spotting that is thought to be due to the attack of environmental acids on the coating. Environmental etch manifests itself as spots or marks on or in the coating that often cannot be rubbed out. Environmental etch is particularly a problem where the coating is a high gloss and/or a high DOI (distinctness-of-image) coating, since defects in the surface of such a glossy or highly reflective coating are very noticeable. High gloss and/or high DOI coatings are widely utilized in the coatings art. The automotive industry has made extensive use of such coatings, often as color-plus-clear composite coatings for automotive body panels. Automotive coatings are especially likely to exhibit environmental etch because the significant outdoor exposure and the frequent heat buildup in the coated article are factors favoring etch degradation.

Prior art coating compositions such as high-solids enamels, although known for their durability and weatherability when used in exterior paints, have not provided the desired level of resistance to environmental etch when used as topcoat coatings. Environmental etch has been a particular concern with prior art high gloss or high DOI coatings. Compositions such as polyurethanes, acid-epoxy systems and the like have been proposed for use as topcoat coatings. However, many prior art systems suffer from disadvantages such as coatability problems, compatibility problems with underlying coatings, or high content of volatile organic compounds. Moreover, very few one-pack coating compositions have been found that provide satisfactory resistance to environmental etch, especially under the demanding conditions to which automotive coatings are subjected. Thus, there exists a continuing need for curable coating compositions with low content of volatile organic compounds that provide satisfactory resistance to environmental etch.

Moreover, many prior art aqueous dispersions required the use of mechanical dispersing means, such as high stress or high shear means. Such mechanical dispersing means are disadvantageous in that they are expensive and prone to coagulation and the like.

It would therefore be desirable to provide aqueous dispersions that do not require the use of mechanical dispersing means.

It is an object of the invention to provide aqueous dispersions for use in curable coating compositions that provide improvements in manufacturability, performance properties, and/or stability.

SUMMARY OF THE INVENTION

These and other objects have been met with the aqueous dispersions of the invention. The invention provides an aqueous dispersion comprising a stabilizing resin (P1) and a compound (P2) comprising functional groups reactable with a crosslinking agent. Compound (P2) is dispersed into stabilizing resin (P1). Coating compositions of the invention containing the aqueous dispersion of the invention may further comprise an optional crosslinking agent (P3) which may or may not be dispersed into stabilizing resin (P1). In a particularly preferred embodiment, both the stabilizing resin (P1) and compound (P2) will comprise functional groups which are carbamate or are convertible to carbamate.

DETAILED DESCRIPTION OF THE PREFERRED EMBODIMENTS

The aqueous dispersions of the invention require a compound (P2) dispersed in a a stabilizing resin (P1). Compound (P2) must have one or more functional groups that are reactive with a crosslinking agent.

Stabilizing resin (P1) is an acrylic copolymer having a plurality of functional groups that impart water dispersibility. Stabilizing resin (P1) is the free radical polymerization product of one or more hydrophobic ethylenically unsaturated monomers and one or more hydrophilic ethylenically unsaturated monomers, such monomers being used in an appropriate ratio so as to achieve the desired degree of stabilization. It will be appreciated that the plurality of stabilizing or water dispersible functional groups will typically be incorporated into the copolymer via the polymerization of the hydrophilic monomers.

Stabilizing resin (P1) will normally have a number average molecular weight of from 5000 to 50,000, preferably from 10,000 to 25,000, with molecular weights of from 15,000 to 20,000 being most preferred. Stabilizing resin (P1) will further have an acid number of from 40 to 60, preferably 42 to 52, and most preferably 44 to 48.

The functional groups that impart water dispersibility or stability to the stabilizing resin (P1) can be anionic, cationic, or nonionic. Anionic and nonionic groups are most preferred because of the tendency of the cationic groups, (i.e, amine) groups to cause yellowing in any final cured coating.

Suitable hydrophobic ethylenically unsaturated monomers are vinyl esters, vinyl ethers, vinyl ketones, aromatic or heterocyclic aliphatic vinyl compounds, and alkyl esters having more than 4 carbon atoms of alpha,beta-ethylenically unsaturated mono- or dicarboxylic acids containing 3 to 5 carbons. Preferred are the aromatic or heterocyclic aliphatic vinyl compounds and the C4 or greater alkyl esters of alpha, beta-unsaturated monocarboxylic acids such as acrylic or methacrylic acid.

Representative examples of suitable esters of acrylic, methacrylic, and crotonic acids include, without limitation, those esters from reaction with saturated aliphatic and cycloaliphatic alcohols containing from 4 to 20 carbon atoms, such as n-butyl, isobutyl, tert-butyl, 2-ethylhexyl, lauryl, stearyl, cycolhexyl, trimethylcyclohexyl, tetrahydrofurfuryl, stearyl, and sulfoethyl. Preferred are alkyl esters of from 4 to 12 carbon atoms, with alkyl esters of from 4 to 10 carbon atoms being most preferred. 2-ethylhexyl acrylate is especially preferred.

Representative examples of aromatic or heterocylic aliphatic vinyl compounds include, without limitation, such compounds as styrene, alpha-methyl styrene, vinyl toluene, tert-butyl styrene, and 2-vinyl pyrrolidone. Styrene is a most preferred example.

Most preferred hydrophobic monomers for use in making stabilizing resin (P1) are styrene, ethylhexyl acrylate, and butyl methacrylate.

Suitable hydrophilic ethylenically unsaturated monomers are those which act to stabilize both the resin (P1) and compound (P2) in the aqueous dispersion. Illustrative examples are low molecular weight alkyl acrylate esters which allow hydrogen bonding, weak hydrogen bond donors, strong hydrogen bond donors, and hydrogen bond acceptors based on polyethers.

For example, low molecular weight alkyl esters of alpha, beta-ethylenically unsaturated monocarboxylic acids having alkyl groups of less than three carbons may be used as the hydrophilic monomers. Representative examples include the esters of acrylic and methacrylic acid with saturated aliphatic alcohols of three or less carbons atoms, i.e., methyl, ethyl, and propyl.

Suitable weak hydrogen bond donars are those ethylenically unsaturated monomers having functional groups such as hydroxyl, carbamate, and amide. Carbamate functional ethylenically unsaturated monomers such as described below may be used. Hydroxyl functional ethylenically unsaturated monomers such as hydroxyalkyl acrylates and methacrylates are also suitable. Representative examples include, without limitation, Hydroxy ethyl acrylate, hydroxyethyl methacrylate, and the like. Also suitable are acrylic and methacrylic acid amides and aminoalkyl amides, acrylonitrile and methacrylonitrile.

Strong hydrogen bond donors such as strong acids are also suitable for use as the hydrophilic monomers. Useful ethylenically unsaturated acids include alpha,beta-olefinically unsaturated monocarboxylic acids containing 3 to 5 carbon atoms, alpha,beta-olefinically unsaturated dicarboxylic acids containing 4 to 6 carbon atoms and their anhydrides, unsaturated sulfonic acids, and unsaturated phosphonic acids. Representative examples include, without limitation, acrylic acid, methacrylic acid, crotonic acid, fumaric acid, maleic acid, itaconic acid and their respective anhydrides. Acrylic and methacrylic acid are most preferred.

Polyether based hydrogen bond acceptors may also be used. Useful ethylenically unsaturated polyethers include ethylene oxide and the alkoxy poly(oxyalkylene) alcohol esters or amides of alpha,beta-olefinically unsaturated monocarboxylic acids containing 3 to 5 carbon atoms. The alkoxy poly(oxyalkylene) alcohol or alkoxy poly (oxyalkylene) amine employed in forming the monomer can be obtained by the alkoxylation of monohydric alcohols with ethylene oxide or mixtures of ethylene oxide with other epoxides of up to ten carbon atoms, such as propylene oxide or butylene oxide. The residue of the alkoxy poly (oxyalkylene) alcohol or amine contained in the acrylic polymer can be represented by $D(CH(R_1)CH_2O—)_n R_2$, and is either alkoxy polyoxyethylene or an alkoxy polyoxyethylene/polyoxyalkylene copolymer, having a degree of polymerization of n, n being an integer from one to one thousand. D is O in the case of the alkoxy poly(oxyalkylene) alcohol and NH in the case of the amine. Preferably, n is an integer from 20 to 200; more preferably, from 40 to 70. $R_1$ is thus either hydrogen or a mixture of hydrogen and alkyls of one to eight carbon atoms. It is particularly advantageous for $R_1$ to be either hydrogen or a mixture of hydrogen and alkyls of one to three carbon atoms. $R_2$ is an alkyl of one to thirty carbon atoms. $R_2$ is preferably an alkyl of one to ten carbon atoms. In one embodiment, $R_1$ can be hydrogen and $R_2$ can be methyl.

Preferably, the hydrophilic monomers used to make stabilizing resin (P1) will have functional groups selected from the group consisting of carboxylic acid groups, hydroxyl groups, oxirane groups, amide groups, and mixtures thereof. Most preferably, hydrophilic monomers having a mixture of acid groups, hydroxyl groups, and carbamate groups will be used. However, hydrophilic monomers having carboxylic acid groups will preferably be minimized as much as possible to avoid negative effects in finished film properties. Most preferred hydrophilic monomers are acrylic acid, hydroxy ethyl acrylate and hydroxy ethyl methacrylate.

In a particularly preferred embodiment, stabilizing resin (P1) will include carbamate functional groups or functional groups convertible to carbamate groups such as hydroxyl or isocyanate. Such desired functional groups can be incorporated into the stabilizing resin (P1) via the polymerization of ethylenically unsaturated monomers containing the desired functionality such as described herein. Alternatively, a 'pre-stabilizing' copolymer could be reacted with a second compound having the desired functional group.

The carbamate functionality can be introduced into the stabilizing resin (P1) in a variety of ways.

One way is to use in the polymerization reaction an acrylic monomer having a carbamate functionality in the ester portion of the monomer. Such monomers are well-known in the art and are described, for example in U.S. Pat. Nos. 3,479,328, 3,674,838, 4,126,747, 4,279,833, and 4,340,497, the disclosures of which are incorporated herein by reference. For example, one method of synthesis involves reaction of a hydroxy ester with urea to form the carbamyloxy carboxylate (i.e., carbamate-modified acrylate). Another method of synthesis reacts an .alpha.,.beta.-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the carbamate-functional monomer. Other methods of preparing carbamate-modified acrylic monomers are described in the art and can be utilized as well. The carbamate functional acrylic monomer can then be polymerized along with the other suitable ethylenically-unsaturated monomers described herein.

An alternative route for introducing the carbamate functionality onto the stabilizing resin (P1) is to react a suitable already-formed or pre-stabilizing polymer with another component to adduct a carbamate-functional group to the acrylic polymer backbone, as described in U.S. Pat. No. 4,758,632, the disclosure of which is incorporated herein by reference. One technique for preparing carbamate-functional polymers involves thermally decomposing urea to ammonia and HNCO in the presence of a hydroxy-functional acrylic polymer to form as the reaction product a carbamate-functional acrylic polymer.

Another technique involves reacting the hydroxyl group of a hydroxyalkyl carbamate with the isocyanate group of an isocyanate-functional acrylic polymer to form the carbamate-functional acrylic polymer. Isocyanate-functional acrylics are known in the art and are described, for example in U.S. Pat. No. 4,301,257, the disclosure of which is incorporated herein by reference. Ethylenically unsaturated isocyanate monomers are well-known in the art and include meta-isopropenyl-.alpha.,.alpha.-dimethylbenzyl isocyanate (sold by American Cyanamid as TMI.RTM.) and isocyanatoethyl methacrylate.

Yet another technique is to react cyclic carbonate groups on an acrylic with ammonia to form the carbamate-functional acrylic polymer. Cyclic carbonate-functional acrylic polymers are known in the art and are described, for example, in U.S. Pat. No. 2,979,514, the disclosure of which is incorporated herein by reference.

Another approach is a transcarbamylation reaction of a hydroxy-functional polymer with an alkyl carbamate.

Finally, a more difficult, but feasible, way of preparing the most preferred carbamate functional stabilizing resin (P1) would be to trans-esterify an acrylate polymer with a hydroxyalkyl carbamate.

The hydrophilic monomers should be used in an amount of from 4 to 80% by weight, preferably from 10 to 40%, most preferably from 20 to 30% by weight, all based on the total amount of monomers used to prepare stabilizing resin (P1). The hydrophobic monomers should be used in an amount of from 20 to 96% by weight, preferably from 60 to 90% by weight, most preferably from 65 to 85% by weight, all based on the total amount of monomers used to prepare stabilizing resin (P1).

The stabilizing resin (P1) may be prepared by using conventional techniques, such as free radical polymerization, cationic polymerization, or anionic polymerization, in, for example, a batch or semi-batch process, with free radical polymerization being most preferred. For instance, the polymerization may be carried out by heating the ethylenically unsaturated monomers in bulk or in organic solution or aqueous dispersion in the presence of a free radical source, such as an organic peroxide or azo compound and, optionally, a chain transfer agent for a batch process; or, alternatively, the monomers and initiator(s) may be fed into the heated reactor at a controlled rate in a semi-batch process.

Typical free radical sources are organic peroxides such as dialkyl peroxides, peroxyesters, peroxydicarbonates, diacyl peroxides, hydroperoxides, and peroxyketals; and azo compounds such as 2,2'-azobis(2-methylbutanenitrile) and 1,1'-azobis(cycohexanecarbonitrile). Typical chain transfer agents are mercaptans such as octyl mercaptan, n- or tert-dodecyl mercaptan, thiosalicyclic acid, mercaptoacetic acid, and mercaptoethanol; halogenated compounds, and dimeric alpha-methyl styrene.

The free radical polymerization is usually carried out at temperatures from about 20.degree. C. to about 200.degree. C., preferably from 90.degree. C. to 170.degree. C. The reaction may conveniently be done at the temperature at which the solvent or solvent mixture refluxes, although reflux is not necessary to the reaction. The initiator should be chosen to match the temperature at which the reaction is carried out, so that the half-life of the initiator at the reaction temperature should preferably be no more than thirty minutes.

If solvents are used in the polymerization reaction, the solvents used are preferably water or water-soluble or -miscible organic solvents that can function as cosolvents. A cosolvent is useful to aid in dispersion of the components and in flow during cure of the composition. Examples of useful solvents include methyl ethyl ketone, methyl isobutyl ketone, xylene, n-amyl acetate; and cosolvents such as N-methylpyrrolidone and glycol ethers like ethylene glycol butyl ether, ethylene glycol butyl ether acetate, diethylene glycol butyl ether, ethylene glycol 2-ethylhexyl ether, propylene glycol methyl ether, propylene glycol methyl ether acetate, propylene glycol butyl ether, and dipropylene glycol butyl ether.

The solvent or solvent mixture is generally heated to the reaction temperature and the monomers and initiator(s) used to make the stabilizing resin (P1) are added at a controlled rate over a period of time, usually between 2 and 6 hours. A chain transfer agent or additional solvent may be added concurrently with the monomers and initiator(s). The mixture is usually held at the reaction temperature after the additions for a period of time to complete the reaction. Optionally, additional initiator may be added during the latter stages of the addition or after the addition is completed, usually over a period of one to sixty minutes, to ensure complete conversion.

Dispersible compound (P2) may be monmeric, oligomeric, or polymeric in nature. Dispersible compound (P2) will generally have a number average molecular weight of from 200 to 100,000, preferably from 200 to 20,000, and most preferably from 200 to 7000.

Dispersible compound (P2) may be acrylic, modified acrylic, polyurethane, polyester, polyurea, alkyd, polysiloxane, polyethers, epoxy upgrades, mixtures thereof, and the like. Preferably, compound (P2) will be polyurethane, polyester, acrylic, or the like. Most preferably, the polymeric compound (a) will be polyurethane or acrylic, especially a hydroxyl functional polyurethane polymer or urethane oligomer or a carbamate and hydroxyl functional acrylic.

Suitable dispersible compounds (P2) must comprise a plurality of functional groups (i) which contain an active hydrogen group. "Active hydrogen group" as used herein refers to functional groups which donate a hydrogen group during the reaction with the functional groups of compounds (a). Examples of active hydrogen groups are carbamate groups, hydroxyl groups, amino groups, thiol groups, acid groups, hydrazine groups, activated methylene groups, and the like.

In one preferred embodiment of the invention, the dispersible compound (P2) is an acrylic polymer. The acrylic polymer preferably has a molecular weight of 500 to 1,000,000, and more preferably of 1500 to 50,000. As used herein, "molecular weight" refers to number average molecular weight, which may be determined by the GPC method using a polystyrene standard. Such polymers are well-known in the art, and can be prepared from monomers such as methyl acrylate, acrylic acid, methacrylic acid, methyl methacrylate, butyl methacrylate, cyclohexyl methacrylate, and the like. The active hydrogen functional group, e.g., hydroxyl, can be incorporated into the ester portion of the acrylic monomer. For example, hydroxy-functional acrylic monomers that can be used to form such polymers include hydroxyethyl acrylate, hydroxybutyl acrylate, hydroxybutyl methacrylate, hydroxypropyl acrylate, and the like. Amino-functional acrylic monomers would include t-butylaminoethyl methacrylate and t-butylaminoethylacrylate. Other acrylic monomers having active hydrogen functional groups in the ester portion of the monomer are also within the skill of the art.

Modified acrylics can also be used as the dispersible compound (P2) according to the invention. Such acrylics may be polyester-modified acrylics or polyurethane-modified acrylics, as is well-known in the art. Polyester-modified acrylics modified with ε-caprolactone are described in U.S. Pat. No. 4,546,046 of Etzell et al, the disclosure of which is incorporated herein by reference. Polyurethane-modified acrylics are also well-known in the art. They are described, for example, in U.S. Pat. No. 4,584,354, the disclosure of which is incorporated herein by reference.

Preferred carbamate functional dispersible compounds (P2) used in the composition of the invention can be prepared in a variety of ways. One way to prepare such polymers is to prepare an acrylic monomer having carbamate functionality in the ester portion of the monomer. Such monomers are well known in the art and are described, for example in U.S. Pat. Nos. 3,479,328, 3,674,838, 4,126,747, 4,279,833, and 4,340,497, 5,356,669, and WO 94/10211, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically unsaturated monomers, if desired, by techniques well known in the art.

An alternative route for preparing dispersible compound (P2) used in the composition of the invention is to react an already-formed polymer such as an acrylic polymer with another component to form a carbamate-functional group appended to the polymer backbone, as described in U.S. Pat. No. 4,758,632, the disclosure of which is incorporated herein by reference. One technique for preparing polymers useful as component (c) involves thermally decomposing urea (to give off ammonia and HNCO) in the presence of a hydroxy-functional acrylic polymer to form a carbamate-functional acrylic polymer. Another technique involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well known in the art and include unsaturated m-tetramethyl xylene isocyanate (sold by American Cyanamid as TMI®). Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. Another technique is to transcarbamylate a hydroxy-functional acrylic polymer with an alkyl carbamate. A more difficult, but feasible way of preparing the polymer would be to trans-esterify an acrylate polymer with a hydroxyalkyl carbamate.

The preferred carbamate functional acrylic polymer useful as dispersible compound (P2) will generally have a molecular weight of 2000–20,000, and preferably from 3000–6000. As used herein, molecular weight means number average molecular weight, and can be determined by the GPC method using a polystyrene standard. The carbamate content of the polymer, on a molecular weight per equivalent of carbamate functionality, will generally be between 200 and 1500, and preferably between 300 and 500.

The polymer component useful as dispersible compound (P2) can be represented by the randomly repeating units according to the following formula:

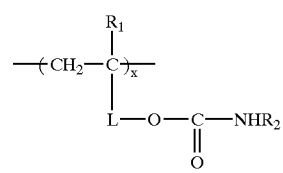

In the above formula, $R_1$ represents H or $CH_3$. R2 represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix. The values x and y represent weight percentages, with x being 10 to 90% and preferably 40 to 60%, and y being 90 to 10% and preferably 60 to 40%.

In the formula, A represents repeat units derived from one or more ethylenically unsaturated monomers. Such monomers for copolymerization with acrylic monomers are known in the art. They include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), styrene, vinyl toluene and the like.

L represents a divalent linking group, preferably an aliphatic of 1 to 8 carbon atoms, cycloaliphatic, or aromatic linking group of 6 to 10 carbon atoms. Examples of L include

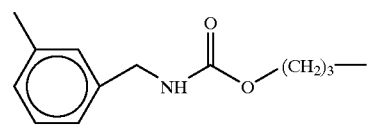

—$(CH_2)$—, —$(CH_2)_2$—, —$(CH_2)_4$—, and the like. In one preferred embodiment, —L— is represented by —COO—L'— where L' is a divalent linking group. Thus, in a preferred embodiment of the invention, the polymer component (a) is represented by randomly repeating units according to the following formula:

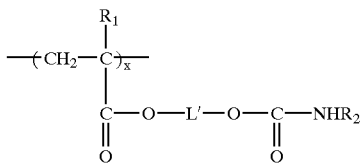

In this formula, $R_1$, $R_2$, A, x, and y are as defined above. L' may be a divalent aliphatic linking group, preferably of 1 to 8 carbon atoms, e.g., —(CH$_2$)—, —(CH$_2$)$_2$—, —(CH$_2$)$_4$—, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate group.

A most preferred carbamate and hydroxyl functional polymer useful as dispersible compound (P2) can be described as follows.

The most preferred carbamate functional polymer will have a number average molecular weight of from 1000 to 5000, a carbamate equivalent weight of from 300 to 600, and a Tg of from 0 to 150° C. A most preferred carbamate-functional polymer will have a number average molecular weight of from 1500 to 3000, a carbamate equivalent weight of from 350 to 500, and a Tg of from 25 to 100° C.

This carbamate functional polymer useful as dispersible compound (P2) will have from at least 66 to 100% by weight, based on the total weight of the polymer, of one or more repeat units A selected from the group consisting of

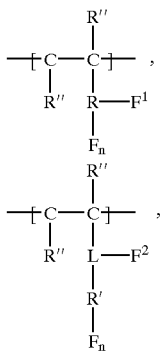

and mixtures thereof, and from 0 to less than 35% by weight, based on the total weight of the polymer, of one or more repeat units A' having the structure

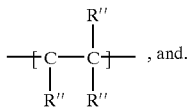

More preferably, this most preferred carbamate functional polymer useful as dispersible compound (P2) will have from 80 to 100 weight percent of one or more repeat units A and from 20 to 0 weight percent of one or more repeat units A', and most preferably, from 90 to 100 weight percent of one or more repeat units A and from 10 to 0 weight percent of one or more repeat units A', based on the total weight of the final carbamate functional polymer. A particularly preferred carbamate functional polymer of the invention will have more than 90 weight percent of one or more repeat units A and less than 10 weight percent, preferably between 1 and 9 weight percent, of one or more repeat units A', based on the total weight of the carbamate functional polymer of the invention.

In the above, R is an at least divalent nonfunctional linking group having from 1 to 60 carbon atoms and from 0 to 20 heteroatoms selected from the group consisting of oxygen, nitrogen, sulfur, phosphorus, and silane, and mixtures thereof. As used here, "nonfunctional" refers to the absence of groups which are reactive with crosslinking agents under traditional coating curing conditions.

Illustrative examples of suitable R groups are aliphatic or cycloaliphatic linking groups of from 1 to 60 carbons, aromatic linking groups of from 1 to 10 carbons, and mixtures thereof. Preferred R groups include aliphatic or cycloaliphatic groups of from 2 to 10 carbons. R may, and preferably will, include one or more heteroatoms via one or more divalent internal linking groups such as esters, amides, secondary carbamates, ethers, secondary ureas, ketones, and mixtures thereof. Internal linking groups selected from the group consisting of esters, secondary carbamates, and mixtures thereof, are more preferred, with esters being most preferred.

Examples of particularly preferred R groups are set forth below. Note that $F^1$ is not part of R but is shown in the structures below to provide perspective.

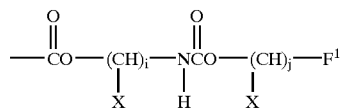

and isomers thereof, wherein X is H or is a a monovalent nonfunctional linking group having from 1 to 20 carbon atoms and from 0 to 20 heteroatoms selected from the group consisting of oxygen, nitrogen, sulfur, phosphorus, and silane, and mixtures thereof; i, j, g, and h are intergers from 0 to 8; and Q is an at least divalent nonfunctional linking group having from 1 to 60 carbon atoms and from 0 to 20 heteroatoms selected from the group consisting of oxygen, nitrogen, sulfur, phosphorus, and silane, and mixtures thereof.

A most preferred R group is

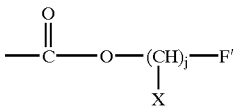

wherein j is from 1 to 6 and X is as defined above.

R' is an at least monovalent nonfunctional linking group having from 1 to 60 carbon atoms and from 0 to 20 heteroatoms selected from the group consisting of oxygen, nitrogen, sulfur, phosphorus, and silane, and mixtures thereof. As used here, "nonfunctional" refers to the absence of groups which are reactive with crosslinking agents under traditional coating curing conditions.

Illustrative examples of suitable R' groups are aliphatic or cycloaliphatic linking groups of from 1 to 60 carbons, aromatic linking groups of from 1 to 10 carbons, and mixtures thereof. Preferred R' groups include aliphatic or cycloaliphatic groups of from 2 to 10 carbons. R' may, and preferably will, include one or more heteroatoms via one or more divalent internal linking groups such as esters, amides, secondary carbamates, ethers, secondary ureas, ketones, and mixtures thereof. The use of esters as internal linking groups is most preferred.

Examples of particularly preferred R' groups are

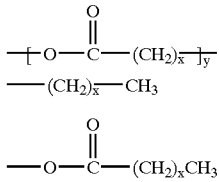

wherein x and y are from 0 to 10, preferably from 3 to 8.

In a preferred embodiment, the at least monovalent nonfunctional linking group R' will comprise at least one branched alkyl group of from 5 to 20 carbons, preferably from 5 to 15 carbons and most preferably from 8 to 12 carbons. An example of an especially suitable structure for incorporation into linking group R' is

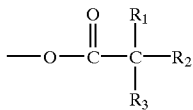

wherein $R_1$, $R_2$, and $R_3$ are alkyl groups of from 1 to 10 carbons each. Most preferably, $R_1$, $R_2$, and $R_3$ will total from 8 to 12 carbons with at least one of $R_1$, $R_2$, and $R_3$ being a methyl group. In a most preferred embodiment, n will be 0 when R' comprises this branched alkyl structure.

R" is H or a monovalent nonfunctional linking group having from 1 to 20 carbon atoms and from 0 to 20 heteroatoms selected from the group consisting of oxygen, nitrogen, sulfur, phosphorus, and silane, and mixtures thereof.

Illustrative examples of suitable R" groups are hydrogen, aliphatic or cycloaliphatic linking groups of from 1 to 60 carbons, aromatic linking groups of from 1 to 10 carbons, and mixtures thereof. R" may, and preferably will, include one or more heteroatoms via one or more divalent internal linking groups such as esters, amides, secondary carbamates, ethers, secondary ureas, ketones, and mixtures thereof.

Preferred R" groups are H, —$CH_3$, aromatic groups such as benzyl, and alkyl esters of from 2 to 10 carbons, especially from 4 to 8 carbons. H and methyl are most preferred as R".

L is an at least trivalent nonfunctional linking group having from 1 to 60 carbon atoms and from 0 to 20 heteroatoms selected from the group consisting of oxygen, nitrogen, sulfur, phosphorus, and silane, and mixtures thereof. As used here, "nonfunctional" refers to the absence of groups which are reactive with crosslinking agents under traditional coating curing conditions.

Illustrative examples of suitable L groups are aliphatic or cycloaliphatic linking groups of from 1 to 60 carbons, aromatic linking groups of from 1 to 10 carbons, and mixtures thereof. Preferred L groups include aliphatic or cycloaliphatic groups of from 2 to 10 carbons. L may, and preferably will, include one or more heteroatoms via one or more divalent internal linking groups such as esters, amides, secondary carbamates, ethers, secondary ureas, ketones, and mixtures thereof. Internal linking groups selected from the group consisting of esters, secondary carbamates, and mixtures thereof, are more preferred, with esters being most preferred.

An example of preferred L groups are

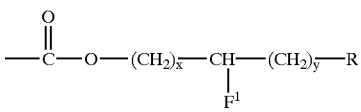

and isomers thereof, wherein $F^1$ and R are as described, x and y may the same or different and are from 0 to 10, preferably from 1 to 3, and is most preferably 1.

F, $F^1$ and $F^2$ are functional groups selected from the group consisting of primary carbamate groups, hydroxyl groups, and mixtures thereof, such as beta-hydroxy primary carbamate groups, with the proviso that at least one of $F^1$ and $F^2$ are a primary carbamate group or a beta-hydroxy primary carbamate group, and n is an integer from 0 to 3, most preferably 0.

Polyesters having active hydrogen groups such as hydroxyl groups can also be used as the dispersible compound (P2) in the aqueous dispersion of the invention. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

Carbamate functional polyesters for use as dispersible compound (P2) may be prepared as follows.

Suitable polyesters can be prepared by the esterification of a polycarboxylic acid or an anhydride thereof with a polyol and/or an epoxide. The polycarboxylic acids used to prepare the polyester consist primarily of monomeric polycarboxylic acids or anhydrides thereof having 2 to 18 carbon atoms per molecule. Among the acids that are useful are phthalic acid, hexahydrophthalic acid, adipic acid, sebacic acid, maleic acid, and other dicarboxylic acids of various types. Minor amounts of monobasic acids can be included in the reaction mixture, for example, benzoic acid, stearic acid, acetic acid, and oleic acid. Also, higher carboxylic acids can be used, for example, trimellitic acid and tricarballylic acid. Anhydrides of the acids referred to above, where they exist, can be used in place of the acid. Also, lower alkyl esters of the acids can be used, for example, dimethyl glutarate and dimethyl terephthalate.

Polyols that can be used to prepare the polyester include diols such as alkylene glycols. Specific examples include ethylene glycol, 1,6-hexanediol, neopentyl glycol, and 2,2-dimethyl-3-hydroxypropyl-2,2-dimethyl-3-hydroxypropionate. Other suitable glycols include hydrogenated Bisphenol A, cyclohexanediol, cyclohexanedimethanol, caprolactone-based diols such as the reaction product of e-caprolactone and ethylene glycol, hydroxy-alkylated bisphenols, polyether glycols such as poly(oxytetramethylene)glycol, and the like. Although the polyol component can comprise all diols, polyols of higher functionality can also be used. It is preferred that the polyol be a mixture of at least one diol; and at least one triol, or one polyol of higher functionality. Examples of polyols of higher functionality would include trimethylol ethane, trimethylol propane, pentaerythritol, and the like. Triols are preferred. The mole ratio of polyols of higher functionality to diol is less than 3.3/1, preferably up to 1.4/1.

Carbamate groups can be incorporated into the polyester by first forming a hydroxyalkyl carbamate that can be reacted with the polyacids and polyols used in forming the polyester. A polyester oligomer can be prepared by reacting a polycarboxylic acid such as those mentioned above with a hydroxyalkyl carbamate. An example of a hydroxyalkyl carbamate is the reaction product of ammonia and propylene carbonate. The hydroxyalkyl carbamate is condensed with acid functionality on the polyester or polycarboxylic acid, yielding terminal carbamate functionality. Terminal carbamate functional groups can also be incorporated into the polyester by reacting isocyanic acid with a hydroxy functional polyester. Also, carbamate functionality can be incorporated into the polyester by reacting a hydroxy functional polyester with urea.

Carbamate groups can be incorporated into the polyester by a transcarbamalation reaction. In this reaction, a low molecular weight carbamate functional material derived from a low molecular weight alcohol or glycol ether such as methyl carbamate is reacted with the hydroxyl groups of a hydroxyl functional polyester, yielding a carbamate functional polyester and the original alcohol or glycol ether. The low molecular weight carbamate functional material derived from an alcohol or glycol ether is first prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether is preferred.

Besides carbamate functionality the polyester polymers and oligomers may contain other functional groups such as hydroxyl, carboxylic acid and/or anhydride groups. The equivalent weight of the polyesters containing terminal carbamate groups will be from about 140 to 2500, based on equivalents of carbamate groups. The equivalent weight is a calculated value based on the relative amounts of the various ingredients used in making the polyester, and is based on the solids of the material.

Illustrative carbamate functional polyesters suitable for use as dispersible compound (P2) typically have weight average molecular weights of about 1000 to 30,000, preferably 1000 to 10,000 as determined by gel permeation chromatography using polystyrene as a standard.

Polyurethanes having active hydrogen functional groups suitable for use as dispersible compound (P2) are also well known in the art. They are prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane). They can be provided with active hydrogen functional groups by capping the polyurethane chain with an excess of diol, polyamine, amino alcohol, or the like.

Carbamate functional polyurethanes may be prepared by reacting the active hydrogen groups with a low molecular weight carbamate functional material derived from a low molecular weight alcohol or glycol ether such as methyl.

Other carbamate functional compounds preferred for use as dispersible compound (P2) are carbamate-functional compounds which are the reaction product of a mixture comprising a polyisocyanate or a chain extended polymer, and a compound comprising a group that is reactive with isocyanate or a functional group on the chain extended polymer as well as a carbamate group or group that can be converted to carbamate. Such compounds are described in U.S. Pat. Nos. 5,373,069 and 5,512,639 hereby incorporated by reference.

For example, suitable polyisocyanates can be an aliphatic polyisocyanate, including a cycloaliphatic polyisocyanate or an aromatic polyisocyanate. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis-(cyclohexyl isocyanate) and isophorone diisocyanate. Useful aromatic diisocyanates and araliphatic diisocyanates include the various isomers of toluene diisocyanate, meta-xylylenediioscyanate and paraxylylenediisocyanate, also 4-chloro-1,3-phenylene diisocyanate, 1,5-tetrahydronaphthalene diisocyanate, 4,4'-dibenzyl diisocyanate and 1,2,4-benzene triisocyanate can be used. In addition, the various isomers of α',α',α',α'-tetramethyl xylylene diisocyanate can be used. Also useful as the polyisocyanate are isocyanurates such as DESMODUR® 3300 from Mobay and biurets of isocyanates such as DESMODUR® N1OO from Mobay.

Active hydrogen-containing chain extension agents generally contain at least two active hydrogen groups, for example, diols, dithiols, diamines, or compounds having a mixture of hydroxyl, thiol, and amine groups, such as alkanolamines, aminoalkyl mercaptans, and hydroxyalkyl mercaptans, among others. Both primary and secondary amine groups are considered as having one active hydrogen. Active hydrogen-containing chain extension agents also include water. In a preferred embodiment of the invention, a polyol is used as the chain extension agent, to provide a polyurethane. In an especially preferred embodiment, a diol is used as the chain extension agent with little or no higher polyols, so as to minimize branching. Examples of preferred diols which are used as polyurethane chain extenders include 1,6 hexanediol, cyclohexanedimethylol, and 1,4-butanediol. While polyhydroxy compounds containing at least three hydroxyl groups may be used as chain extenders, the use of these compounds produces branched polyurethane resins. These higher functional polyhydroxy compounds include, for example, trimethylolpropane, trimethylolethane, pentaerythritol, among other compounds.

The polymer may be chain extended in any manner using these compounds having at least two active hydrogen groups. Thus, these compounds may be added to a mixture of polyisocyanate, polyol, and multi-functional compound, or alternatively, may react at an intermediate stage, to link two free isocyanate groups that are present at the terminal ends of an intermediate polymer.

Polymeric chain extension agents can also be used, such as polyester polyols, polyether polyols, polyurethane polyols, or polymeric amino group-containing polymers, as is known in the art. Mixtures of any of the above chain extension agents can also be used.

The reaction of the polyisocyanate and polyol is conducted by heating the components in a suitable reaction medium such as xylene or propylene glycol monoethylether acetate. The use of catalysts for this reaction, e.g., organotin catalysts such as dibutyltin diacetate, is well-known in the art. The degree of polymerization is controlled by the duration of the maintenance of the elevated temperature reaction conditions. Various groups, such as nonionic polyether stabilizing groups, ionic stabilizing groups (e.g., carboxyl groups), unsaturated bond groups, and the like may be incorporated or appended to the polymer, as is known in the art.

The polyisocyanate or chain extended polyisocyanate polymer used in the practice of the present invention contains one or more functional groups for reaction with the compound containing a carbamate group or a group convertible to carbamate. Examples of these groups include isocyanate groups, hydroxyl groups, epoxy groups, unsaturated double bonds, carboxylic acid groups, and ketals. In a preferred embodiment, the functional group on the polymer (A)(1) is a terminal isocyanate group. The presence of isocyanate active hydrogen terminal groups (e.g., hydroxyl) may be controlled by the molar ratio of active hydrogen:NCO in the reaction mixture. A ratio of greater than 1 will tend to provide active hydrogen-terminated polymers. A ratio of less than 1 will tend to provide isocyanate-terminated polymers.

The functional groups on the polymer to be reacted with the compound containing either carbamate groups or groups convertible to carbamate may be terminal groups or they may be pendant groups. Active hydrogen or isocyanate terminal groups may be provided by adjusting the stoichiometry of the chain extension agent and polyisocyanate in the reaction mixture. Other terminal groups may be provided by the use of capping agents. For example, an acid terminal group can be provided by capping the polymer with a hydroxyacid. Pendant functional groups may be provided by using chain extension agents having two active hydrogen groups and the desired functional group, e.g., dimethanol propionic acid, as is well-known in the art.

The carbamate or carbamate convertible group containing compound has a group that is reactive with the functional group on the polyisocyanate or chain extended polymer, and also has either a carbamate group or a group that is capable of forming a carbamate group. Groups that are capable of forming a carbamate group include cyclic carbonate groups, epoxide groups, and unsaturated double bond groups. Cyclic carbonate groups can be converted to carbamate groups by reaction with ammonia. Epoxide groups can be converted to carbamate by reaction with CO2 and then ammonia. Unsaturated double bond groups can be converted to carbamate by reaction with peroxide, then CO2 and ammonia.

The particular functional groups on the carbamate or carbamate convertible group containing compound depends on the specific functional group on the polymer with which the reaction is to take place. If the polymer's functional group is an isocyanate group, the group on the carbamate or carbamate convertible group containing compound is preferably an active hydrogen-containing group such as hydroxyl or amino. For example, an isocyanate group on the polymer can be reacted with a hydroxyalkyl carbamate, or with a hydroxy-containing epoxide with the epoxy group subsequently converted to carbamate by reaction with CO2 and then ammonia. If the polymer's functional group is hydroxyl, the reactive group on the carbamate or carbamate convertible group containing compound may be oxygen of the COO portion of the carbamate group on an alkyl carbamate or methylol, such as with methylol acrylamide (HO—CH2—NH—CO—CHCH2). In the case of the COO group on an alkyl carbamate, the hydroxyl group on the polymer undergoes a transesterification with the COO group, resulting in the carbamate group being appended to the polymer. In the case of methylol acrylamide, the unsaturated double bond is then reacted with peroxide, CO2, and ammonia as described above. If the functional group on the polymer is a carboxyl group, the acid group can be reacted with epichlorohydrin to form a monoglycidyl ester, which can be converted to carbamate by reaction with CO2, and then ammonia. Alternatively, an acid-functional group on the polymer can be reacted with acetic anhydride to generate an anhydride, which can then be reacted with a compound having an active hydrogen group such as hydroxyl and a carbamate group or group that can be converted to carbamate.

In one embodiment, dispersible compound (P2) will be obtained with the use of a carbamate or carbamate convertible group containing compound which contains a group that is reactive with NCO and a group that can be converted to carbamate. Examples of these compounds include active hydrogen-containing cyclic carbonate compounds (e.g., the reaction product of glycidol and CO2) that are convertible to carbamate by reaction with ammonia, monoglycidyl ethers (e.g., Cardura E®) convertible to carbamate by reaction with CO2 and then ammonia, and monoglycidyl esters (e.g., the reaction product of a carboxylic acid and epichlorohydrin) convertible to carbamate by reaction with CO2 and then ammonia, allyl alcohols where the alcohol group is reactive with NCO and the double bond can be converted to carbamate by reaction with peroxide, and vinyl esters where the ester group is reactive with NCO and the vinyl group can be converted to carbamate by reaction with peroxide, then CO2, and then ammonia. Any of the above compounds can be utilized as compounds containing carbamate groups rather than groups convertible to carbamate by converting the group to carbamate prior to reaction with the polymer.

A particularly preferred dispersible compound (P2) is a reactive component (a). Reactive component (a) should have from 12 to 72 carbons, have at least two functional groups (ii), be substantially free of heteroatoms, and not be a crystalline solid at room temperature.

The reactive component (a) when used as dispersible compound (P2) will generally have from 12 to 72 carbons, more preferably from 18 to 54 carbons, and most preferably from 36 to 54 carbons. In a particularly preferred embodiment of the invention, the reactive component (a) will have 36 carbons.

"Heteroatoms" as used herein refers to atoms other than carbon or hydrogen. The phrase "substantially without" heteroatoms as used herein means that the portion of reactive component (a) which does not include functional groups (ii) will generally have no more than two atoms which are other than carbon or hydrogen, i.e., atoms such as N, O, Si, mixtures thereof, and the like. More preferably, that portion of reactive component (a) that does not include functional groups (ii) will have no more than one atom that is other than carbon or hydrogen. In a most preferred embodiment, that portion of reactive component (a) that does not include functional groups (ii) will have no heteroatoms, i.e., will consist solely of carbon and hydrogen atoms. Thus, in a most preferred aspect of the invention, the only heteroatoms in reactive component (a) will be present in functional groups (ii).

It is another aspect of the invention that reactive component (a) will not be a crystalline solid at room temperature, i.e., at temperatures of from 65 to 75° F. "Crystalline" refers to a solid characterized by a regular, ordered arrangement of particles. Rather, reactive component (a) will be an amorphous solid, a wax or a liquid at room temperature. "Amorphous" refers to a noncrystalline solid with no well-defined ordered structure.

In a more preferred embodiment of the invention, reactive component (a) will comprise a mixture of two or more saturated or unsaturated structures selected from the group consisting of noncyclic structures for reactive component (a), aromatic-containing structures for reactive component (a), cyclic-containing structures for reactive component (a), and mixtures thereof. Saturated structures are preferred, especially where durability issues are of concern. For example, a most preferred reactive component (a) will comprise a mixture of two or more structures selected from the group consisting of aliphatic structures for reactive component (a), aromatic-containing structures for reactive component (a), cycloaliphatic-containing structures for reactive component (a), and mixtures thereof.

It is particularly preferred that reactive component (a) comprise at least two, more preferably three, of the three cited structures. If reactive component (a) comprises only two of the three cited structures for reactive component (a), then at least one of the two structures must be present as a mixture of two or more isomers thereof.

For example, the mixture of reactive components (a) may comprise at least one aliphatic structure for reactive component (a) and at least one other structure for reactive component (a) selected from the group consisting of aromatic-containing structures for reactive component (a), cycloaliphatic-containing structures for reactive component (a), and mixtures thereof. If the 'at least one other structure for reactive component (a)' is not a mixture of aromatic-containing structures for reactive component (a) and cycloaliphatic-containing structures for reactive component (a), either the aromatic-containing structures or the cycloaliphatic containing structures must be present as a mixture of two or more isomers.

Alternatively, the mixture of reactive components (a) may comprise at least one aromatic-containing structure for reactive component (a) and at least one other structure for reactive component (a) selected from the group consisting of aliphatic structures for reactive component (a), cycloaliphatic-containing structures for reactive component (a), and mixtures thereof. If the 'at least one other structure for reactive component (a)' is not a mixture of aliphatic structures for reactive component (a) and cycloaliphatic-containing structures for reactive component (a), either the aliphatic structures or the cycloaliphatic containing structures must be present as a mixture of two or more isomers.

In a most preferred embodiment, reactive component (a) will comprise one or more aliphatic structures for reactive component (a), one or more aromatic-containing structures for reactive component (a), and one or more cycloaliphatic-containing structures for reactive component (a). Particularly advantageous mixtures of reactive component (a) will comprise from 3 to 25% by weight of reactive component (a) having an aliphatic structure, from 3 to 25% by weight of reactive component (a) having an aromatic-containing structure, and 50 to 94% by weight of reactive component (a) having a cycloaliphatic-containing structure. More preferred mixtures of reactive component (a) will comprise from 3 to 18% by weight of reactive component (a) having an aliphatic structure, from 5 to 23% by weight of reactive component (a) having an aromatic-containing structure, and 55 to 85% by weight of reactive component (a) having a cycloaliphatic-containing structure. Most preferred mixtures of reactive component (a) will comprise from 5 to 10% by weight of reactive component (a) having an aliphatic structure, from 10 to 20% by weight of reactive component (a) having an aromatic-containing structure, and 60 to 70% by weight of reactive component (a) having a cycloaliphatic-containing structure.

Finally, reactive component (a) must comprise at least two functional groups (ii). Preferred reactive components (a) may have from two to six functional groups (ii) while most preferably reactive component (a) will have two to three functional groups (ii).

Functional groups (ii) may be selected from a wide variety of active hydrogen containing groups and groups reactive with such active hydrogen containing groups. While active hydrogen containing groups are preferred, functional group (ii) may be any one of a pair of reactants which would result in a thermally irreversible chemical linkage such as is described above, i.e., urethane, urea, ester, and ether. It will be appreciated that if one member of a "pair" is selected for use as functional group (ii), the other member of the "pair" will generally be selected as a functional group of crosslinking agent (P3).

Examples of illustrative reactant "pairs" are hydroxy/isocyanate (blocked or unblocked), hydroxy/epoxy, carbamate/aminoplast, carbamate/aldehyde, acid/epoxy, amine/cyclic carbonate, amine/isocyanate (blocked or unblocked), urea/aminoplast, and the like.

Thus, illustrative functional groups (ii) may be selected from the group consisting of carboxyl, hydroxyl, aminoplast functional groups, urea, carbamate, isocyanate, (blocked or unblocked), epoxy, cyclic carbonate, amine, aldehyde and mixtures thereof. Preferred functional groups (ii) are hydroxyl, primary carbamate, isocyanate, aminoplast functional groups, epoxy, carboxyl and mixtures thereof. Most preferred functional groups (ii) are hydroxyl, primary carbamate, and mixtures thereof.

Aminoplast functional groups may be defined as those functional groups resulting from the reaction of an activated amine group and an aldehyde or a formaldehyde. Illustrative activated amine groups are melamine, benzoguanamine, amides, carbamates, and the like. The resulting reaction product may be used directly as functional group (ii) or may be etherified with a monofunctional alcohol prior to use as functional group (ii).

Amine groups suitable for use as functional group (ii) may be primary or secondary, but primary amines are most preferred.

Illustrative examples of suitable reactive components (a) having functional groups (ii) which are carboxyl are fatty acids and addition reaction products thereof, such as dimerized, trimerized and tetramerized fatty acid reaction products and higher oligomers thereof. Suitable acid functional dimers and higher oligomers may be obtained by the addition reaction of C12–18 monofunctional fatty acids. Suitable monofunctional fatty acids may be obtained from Cognis Corporation of Ambler, Pa. Such materials will be acid functional and will contain some unsaturation. In addition, saturated and unsaturated dimerized fatty acids are commerically available from Uniqema of Wilmington, Del.

Hydroxyl functional reactive components (a) are commercially available as the Pripol™ saturated fatty acid dimer (PripolTM 2033) supplied by Uniqema of Wilmington, Del. Hydroxyl functional reactive components (a) may also be obtained by reduction of the acid group of the above discussed fatty acids.

Reactive components (a) having two or more carbamate functional groups may be obtained via the reaction of the hydroxyl functional reactive components (a) with a low molecular weight carbamate functional monomer such as methyl carbamate under appropriate reaction conditions. Alternatively, carbamate functional reactive components (a) may be made via decomposition of urea in the presence of hydroxyl functional reactive component (a) as described above. Finally, carbamate functional reactive components (a) can be obtained via the reaction of phosgene with the hydroxyl functional reactive component (a) followed by reaction with ammonia.

Reactive components (a) having amine functional groups (ii) may be obtained via reaction of the acid functional component (a) to form an amide, followed by conversion to a nitrile and subsequent reduction to an amine.

Reactive components (a) having isocyanate functional groups (ii) made be obtained via reaction of the amine functional component (a) described above with carbon dioxide.

Reactive components (a) having aminoplast functional groups (ii) may be made via reaction of carbamate or amide functional reactive component (a) as described above with formaldehyde or aldehyde. The resulting reaction product may optionally be etherified with low boiling point alcohols.

Reactive components (a) having aldehyde functional groups (ii) may be made via reduction of the acid functional reactive components (a) described above.

Reactive components (a) having urea functional groups (ii) may be made via reaction of an amine functional component (a) with urea. Alternatively, amine functional component (a) can be reacted with phosgene followed by reaction with ammonia to produce the desired urea functional groups (ii).

Reactive components (a) having epoxy functional groups (ii) may be made using either saturated or unsaturated fatty acids described above. If an unsaturated fatty acid is used, reaction with peroxide will form internal epoxy groups. More preferably, an acid or hydroxyl functional reactive component (a) will be reacted with epichlorohydrin. Preferred epoxy functional reactive components (a) will be obtained using saturated starting materials.

Reactive components (a) having cyclic carbonate functional groups (ii) may be made via carbon dioxide insertion into an epoxy functional reactive component (a) as described above.

A preferred example of for reactive component (a) will have the following structures therein:

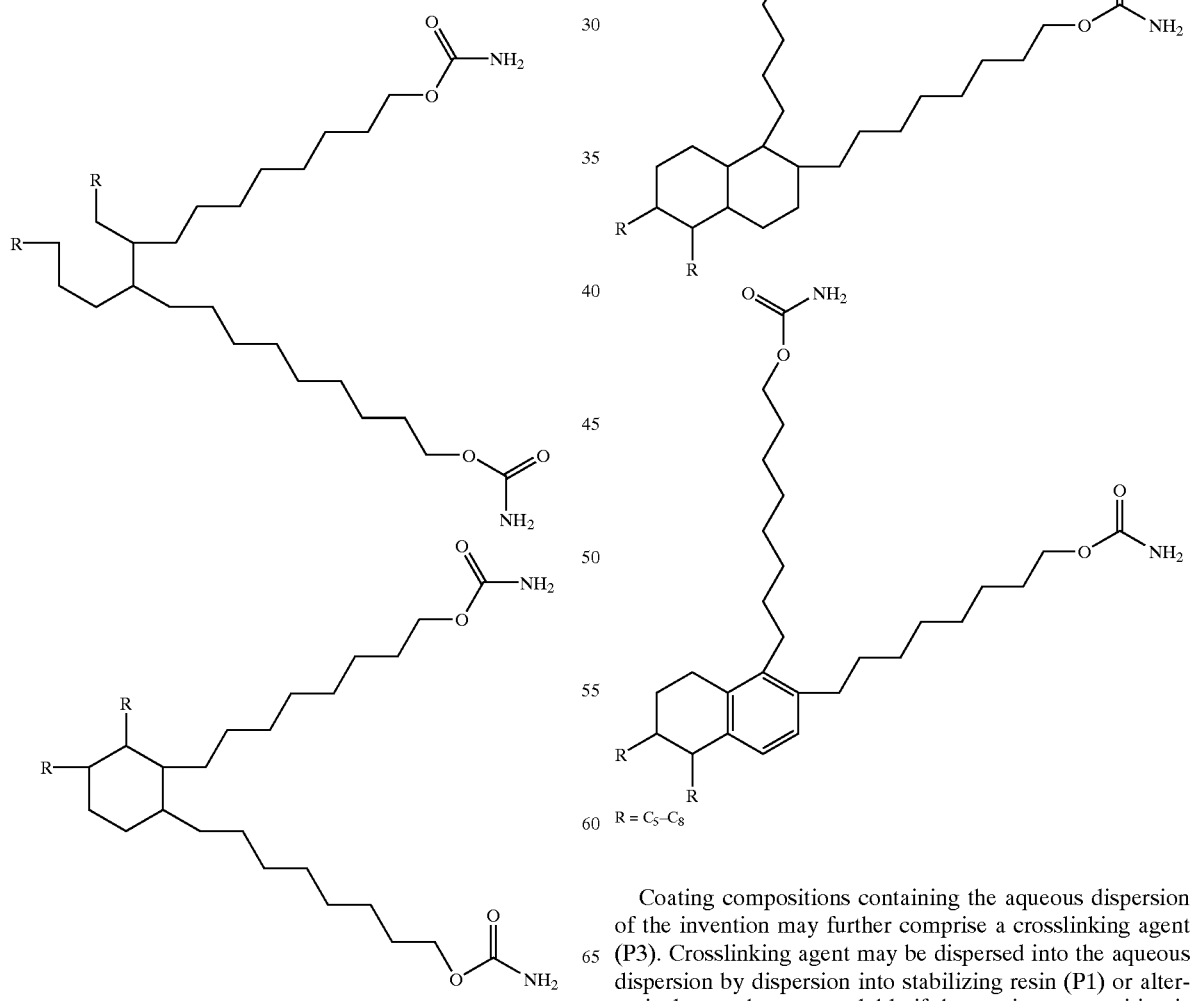

$R = C_5-C_8$

Coating compositions containing the aqueous dispersion of the invention may further comprise a crosslinking agent (P3). Crosslinking agent may be dispersed into the aqueous dispersion by dispersion into stabilizing resin (P1) or alternatively may be water soluble if the coating composition is a one component system. If the coating composition containing the aqueous dispersion of the invention is a two component coating system, the crosslinking agent (P3) may or may not be dispersed in a stabilizing resin (P1) which may be the same or different as that used in the binder component of the two component coating composition.

It will be appreciated that the selection of the crosslinking agent (P3) will be dependent upon the functional groups of the compound (P2). As indicated, crosslinking agent (P3) may have any one of the functional group "pairs" discussed above.

Preferred functional groups for use on the crosslinking agent include active methylol or alkoxy groups on aminoplast resins or on other compounds, such as phenol/formaldehyde adducts; blocked isocyanate groups; or siloxane groups. Examples of suitable crosslinking agents are melamine formaldehyde resins (including monomeric or polymeric melamine resin and partially or fully alkylated melamine resin), urea resins (e.g., methylol ureas such as urea formaldehyde resin, alkoxy ureas such as butylated urea formaldehyde resin), polyanhydrides (e.g., polysuccinic anhydride), N-methylol acrylamide emulsions, isobutoxy methyl acrylamide emulsions, and polysiloxanes (e.g., trimethoxy siloxane). Aminoplast resins such as melamine formaldehyde resins or urea formaldehyde resins are especially preferred.

The crosslinking agent (P3) is used in an amount sufficient to produce well-cured, solvent-resistant films. For example, when the preferred melamine curing agents are used, they are used at a total of 3 to 30 weight percent, based upon the total weight of the acrylic graft copolymer of the invention and the crosslinking agent.

The coating compositions containing the aqueous dispersion of the invention may also include a catalyst to enhance the cure reaction. For example, when aminoplast compounds, especially monomeric melamines, are used as a crosslinking agent, a strong acid catalyst may be utilized to reduce the temperature or time needed for full cure. Such catalysts are well-known in the art and include, for example, p-toluenesulfonic acid, dinonylnaphthalene disulfonicacid, dodecylbenzenesulfonic acid, phenyl acid phosphate, monobutyl maleate, butyl phosphate, and hydroxy phosphate ester. These catalysts may be blocked, for example, with an amine, or they may be unblocked. Other catalysts that may be useful in the composition of the invention include Lewis acids, zinc salts, and tin salts such as dibutyl tin dilaurate or dibutyl tin oxide.

Additional water and or cosolvent may be added during preparation of the coating compositions. In a preferred embodiment of the invention, the water and organic solvent, including any cosolvent, is present in the coating composition in an amount of from about 0.01 weight percent to about 99 weight percent, preferably from about 40 weight percent to about 90 weight percent, and more preferably from about 50 weight percent to about 70 weight percent.

Other materials well-known to the coatings artisan, for example, surfactants, fillers, stabilizers, wetting agents, dispersing agents, adhesion promoters, UV absorbers, light stabilizers such as HALS, antioxidants, and rheology control agents, may be incorporated into the coating composition. The amount of these materials used must be controlled to avoid adversely affecting the coating characteristics.

The coating compositions according to the present invention preferably form the outermost layer or intermediate layer of coating on a coated substrate. Preferably, the instant coating compositions are applied over one or more layers of primer coatings. For example, the coating compositions of the invention may be used as an automotive topcoat or basecoat coating applied over a layer of electrocoat primer and/or primer surfacer.

When the present coating compositions are used as topcoat coatings, they preferably have a 20.degree. gloss, as defined by ASTM D523-89, of at least 80 or a DOI, as defined by ASTM E430-91, of at least 80, or both. Such gloss and DOI are particularly useful in providing an automotive finish that will appeal to the buyer of the vehicle. Topcoat coatings may be one coat pigmented coatings or may be a color-plus-clear composite coating. The coating composition of the present invention, if used as a one coat pigmented coating or the color coating of a color-plus-clear composite coating, will include one or more pigments well-known in the art, such as inorganic pigments like titanium dioxide, carbon black, and iron oxide pigments, or organic pigments like azo reds, quinacridones, perylenes, copper phthalocyanines, carbazole violet, monoarylide and diarylide yellows, naphthol orange, and the like. In a preferred embodiment, the coating composition of the present invention is the clearcoat of a color-plus-clear composite coating. The clearcoat may be applied over a color coat according to the invention or may, alternatively, be applied over a color coat of a formulation already known in the art.

Pigmented color coat or basecoat compositions for such composite coatings are well-known in the art and do not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers are preferably crosslinkable, and thus comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful crosslinkable functional groups include hydroxy, epoxy, acid, anhydride, silane, and acetoacetate groups. Preferred crosslinkable functional groups include hydroxy functional groups and amino functional groups.

Basecoat polymers may be self-crosslinking or may require a separate crosslinking agent that is reactive with the functional groups of the polymer. When the polymer comprises hydroxy functional groups, for example, the crosslinking agent may be an aminoplast resin, a polyisocyanate and blocked polyisocyanate resin (including an isocyanurate, biuret, or the reaction product of a diisocyanate and a polyol having less than twenty carbon atoms), and an acid or anhydride functional crosslinking agent.

Coating compositions can be coated on the article by any of a number of techniques well-known in the art. These include, for example, spray coating, dip coating, roll coating, curtain coating, and the like. For automotive body panels, spray coating is preferred. When the coatings will be relatively thick, they are usually applied in two or more coats separated by a time sufficient to allow some of the water and/or solvent evaporate from the applied coating layer ("flash"). The coats as applied are usually from 1 to 3 mils of the coating composition, and a sufficient number of coats are applied to yield the desired final coating thickness.

Where a color-plus-clear composite coating is applied to the prepared substrate, the color coat is usually applied in one or two coats, then allowed to flash, and the clear coat is then applied to the uncured color coat in one or two coats. The two coating layers are then cured simultaneously. Preferably, the cured base coat layer is 0.5 to 1.5 mils thick and the cured clear coat layer is 1 to 3 mils, more preferably 1.6 to 2.2 mils thick.

The coating compositions described herein are preferably subjected to conditions so as to cure the coating layers. Although various methods of curing may be used, thermal-curing is preferred. Generally, thermal curing is effected by exposing the coated article to elevated temperatures provided primarily by radiative heat sources. Curing temperatures will vary depending on the particular blocking groups used in the crosslinking agents, however they generally range between 93.degree. C. and 177.degree. C. In a preferred embodiment, the cure temperature is between 135.degree. C. and 165.degree. C. In another preferred embodiment, a blocked acid catalyst is included in the composition and the cure temperature is between 115.degree. C. and 140.degree. C. In a different preferred embodiment, an unblocked acid catalyst is included in the composition and the cure temperature is between 80.degree. C. and 100.degree. C. The curing time will vary depending on the particular components used and physical parameters, such as the thickness of the layers. Typical curing times range from 15 to 60 minutes, and preferably 15–25 minutes at the target temperature.

What is claimed is:

1. An aqueous dispersion comprising
   a stabilizing resin (P1) having a number average molecular weight of from 5000 to 50,000 which is the free radical polymerization reaction product of a monomer mixture in an organic solution, wherein said monomer mixture comprises one or more hydrophobic ethylenically unsaturated monomers and one or more hydrophilic ethylenically unsaturated monomers, and
   a compound (P2) comprising a plurality of functional groups (i) containing an active hydrogen group and which are reactable with a crosslinking agent,
   wherein compound (P2) is dispersed into stabilizing resin (P1).

2. The aqueous dispersion of claim 1 wherein the functional groups (i) of compound (P2) consist essentially of functional groups selected from the group consisting of active hydrogen containing functional groups.

3. The aqueous dispersion of claim 1 wherein stabilizing resin (P1) has an acid number of from 40 to 60.

4. The aqueous dispersion of claim 3 wherein stabilizing resin (P1) has an acid number of from 42 to 52.

5. The aqueous dispersion of claim 4 wherein stabilizing resin (P1) has an acid number of from 44 to 48.

6. The aqueous dispersion of claim 5 wherein stabilizing resin (P1) has a number average molecular weight of from 10,000 to 25,000.

7. The aqueous dispersion of claim 6 wherein stabilizing resin (P1) has a number average molecular weight of from 15,000 to 20,000.

8. The aqueous dispersion of claim 1 wherein the one or more hydrophilic monomers comprise functional groups selected from the group consisting of carboxylic acids groups, hydroxyl groups, oxirane groups, amide groups, carbamate groups, and mixtures thereof.

9. The aqueous dispersion of claim 1 wherein the dispersible compound (P2) is monomeric.

10. The aqueous dispersion of claim 1 wherein the dispersible compound (P2) is polymeric or oligomeric.

11. The aqueous dispersion of claim 1 wherein the dispersible compound (P2) has a number average molecular weight of from 200 to 100,000.

12. The aqueous dispersion of claim 11 wherein the dispersible compound (P2) has a number average molecular weight of from 200 to 20,000.

13. The aqueous dispersion of claim 12 wherein the dispersible compound (P2) has a number average molecular weight of from 200 to 7000.

14. The aqueous dispersion of claim 12 wherein the dispersible compound (P2) is selected from the group consisting of acrylics, modified acrylics, polyurethanes, polyesters, polyureas, alkyds, polysiloxanes, polyethers, epoxy upgrades, and mixtures thereof.

15. The aqueous dispersion of claim 12 wherein the dispersible compound (P2) is selected from the group consisting of acrylics, polyurethanes, polyesters, and mixtures thereof.

16. The aqueous dispersion of claim 1 wherein the dispersible compound (P2) is a reactive component (a) is not crystalline at room temperature and comprises at least one aromatic-containing structure and at least one other structure for reactive component (a) selected from the group consisting of aliphatic structures, cycloaliphatic structures, and mixtures thereof.

* * * * *